(12) United States Patent
Pank (10) Patent No.: US 8,591,732 B2
(45) Date of Patent: *Nov. 26, 2013

(54) APPARATUS TO SEPARATE LIGHT FLUIDS, HEAVY FLUIDS, AND/OR SEDIMENT FROM A FLUID STREAM

(75) Inventor: Thomas E. Pank, Walkersville, MD (US)

(73) Assignee: Baysaver Technologies, LLC, Mount Airy, MD (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/830,503

(22) Filed: Jul. 6, 2010

(65) Prior Publication Data

US 2011/0049029 A1 Mar. 3, 2011

Related U.S. Application Data

(60) Provisional application No. 61/238,669, filed on Aug. 31, 2009, provisional application No. 61/238,677, filed on Aug. 31, 2009.

(51) Int. Cl.

| | |
|---|---|
| *B01D 17/025* | (2006.01) |
| *B01D 21/02* | (2006.01) |
| *E03F 5/14* | (2006.01) |
| *B01D 17/02* | (2006.01) |
| *B01D 21/00* | (2006.01) |
| *C02F 103/00* | (2006.01) |
| *E03F 5/04* | (2006.01) |

(52) U.S. Cl.
CPC .......... *B01D 17/0211* (2013.01); *B01D 21/003* (2013.01); *B01D 21/02* (2013.01); *B01D 2221/12* (2013.01); *C02F 2103/001* (2013.01); *E03F 5/14* (2013.01); *E03F 5/0403* (2013.01); *E03F 2201/10* (2013.01)

USPC ... 210/170.03; 210/254; 210/521; 210/532.1; 210/538

(58) Field of Classification Search
USPC .......... 210/170.03, 254, 521, 532.1, 538, 540
See application file for complete search history.

(56) References Cited

U.S. PATENT DOCUMENTS

| | | | | |
|---|---|---|---|---|
| 5,498,331 | A * | 3/1996 | Monteith | 210/170.03 |
| 5,746,911 | A * | 5/1998 | Pank | 210/170.03 |
| 6,077,448 | A * | 6/2000 | Tran-Quoc-Nam et al. | 210/521 |
| 6,264,835 | B1 * | 7/2001 | Pank | 210/170.03 |
| 6,547,962 | B2 * | 4/2003 | Kistner et al. | 210/521 |
| 7,314,549 | B2 * | 1/2008 | Swift | 210/532.1 |
| 7,875,174 | B2 * | 1/2011 | Pank | 210/170.03 |
| 7,875,190 | B2 * | 1/2011 | Pank | 210/170.03 |
| 2005/0103698 | A1 * | 5/2005 | Eberly | 210/532.1 |

* cited by examiner

*Primary Examiner* — Christopher Upton
(74) *Attorney, Agent, or Firm* — DNL Zito; Joseph J. Zito; Benjamin Deming (57) ABSTRACT

Three flow paths within a single container are provided for the separation of contaminates, such as floating debris, heavy trash, lighter fluids and heavier fluids, from an effluent stream. A first flow path is provided for low flow conditions wherein the effluent stream pools in a first chamber within the container and the surface of the pooled fluid is drawn off, leaving heavy contaminates within the first chamber. The drawn fluid, with lighter and/or floating contaminates, enters a second chamber. The fluid is drawn from the second chamber below the surface level of the fluid, leaving the lighter and floating contaminates within the second chamber. In moderate flow conditions, a second flow path is established from the first chamber and out the container, bypassing the second chamber. Fluid for the second flow path is drawn from below the surface of the fluid in the first chamber to exclude light and floating contaminates. A third flow path is established when the first and second flow paths are insufficient to accommodate the effluent received by the container. The third flow path draws from the surface of the fluid in the first chamber and bypasses the second chamber in discharging from the container.

4 Claims, 11 Drawing Sheets

SECTION B-B

FIGURE 2
SECTION A-A

SECTION B-B
FIGURE 12

FIGURE 13

SECTION C-C
FIGURE 12A

FIGURE 16

SECTION C-C
FIGURE 15

SECTION C-C
FIGURE 18

APPARATUS TO SEPARATE LIGHT FLUIDS, HEAVY FLUIDS, AND/OR SEDIMENT FROM A FLUID STREAM

REFERENCE TO RELATED CASES

This application claims the benefits of U.S. Provisional applications Ser. No. 61/146,722 and 61/238,669 and 61/238,677.

BACKGROUND OF THE INVENTION

When it rains on a parking lot, a road, or other impervious surface, rain water will not permeate into the ground as it would if the surface were in its natural condition. The rain water will instead run off this surface often discharging directly into a stream or receiving body. Typically, some form of rain water collection and/or diversion is incorporated into the design of a paved surface of sufficient size to warrant storm water control. This results in an accumulation of the rain water prior to discharge into the watershed.

Because impervious surfaces typically have been paved for a purpose, they will have vehicles, activity and/or traffic on them, which will cause an accumulation of pollutants between rain events. The rain water runoff therefore will include a the accumulated pollutants as they are washed from the impervious surface during a rain storm. Treatment of rain water runoff is important to the preservation of watersheds. The pollutants are typically at their highest concentration in the rain water during the first portion of a storm, as most of the pollutants are typically washed off in the initial, and usually less intense, part of a storm. Consequently, the first runoff water is the most critical to treat. In an effort to minimize the impacts of pollutant contaminated runoff water, various systems have been developed to treat runoff water including removing the pollutants by separation and/or filtration.

Because precipitation occurs at variable rates, a system must be able to treat runoff during low rain flow as well as during high rain flow periods. The system must have the capacity to capture and treat polluted runoff while having the ability to properly handle large water flows which exceed the in line treatment capacity of a system, without release of pollutants or untreated contaminated water into the watershed during high rain flow events. Consequently, treating storm water creates additional difficulties because the system must be able to clean the water yet be able to pass very intense storms without flow slowdowns or backups that could cause flooding.

SUMMARY OF THE INVENTION

The apparatus described treats storm water through the diversion of pollutants and contaminated runoff. One embodiment of the invention diverts certain flow levels or volumes of storm water which are typically the most contaminated, so that this water can be treated further by filtration or other treatment means, as this water requires.

The present invention improves on the flow separator taught in U.S. Pat. Nos. 5,746,911 and 6,264,835, both of which are entitled "Apparatus for Separating a Light From a Heavy Fluid." Similar in general operation to the separators of the above patents, the present invention provides for three potential flow paths for runoff water entering the separator device. The present invention provides differentiated treatment to runoff water dependent upon the rate of influent flow into the separator. The present invention, teaches a single structure with multiple chambers which can be retrofit into standard circular manhole structures.

DETAILED DESCRIPTION

A first exemplary embodiment of the invention is illustrated in FIGS. 1-5. The flow separator is located within a cylindrical structure 10, which can be an independent structure or an existing standard cylindrical ground water structure. The structure 10 includes a floor 11 and an interior wall 12, which can be curved, as illustrated, or straight. The wall 12 divides the cylindrical structure 10 into two chambers, a primary chamber 15 and a storage/detainment chamber 16.

At least one inlet 13 and one outlet 14 are provided for intake and discharge of runoff water. The structure can have multiple inlets which can be located in the side or the top of the structure, however all inlets must initially discharge into chamber 15 of the structure. The structure may also have multiple outlets if placed downstream of the separation structure.

A first conduit, surface flow conduit 17 connects primary chamber 15 with storage chamber 16. Surface flow pipe 17 draws fluid from the surface of primary chamber 15 so that heavy contaminates are left behind to accumulate in primary chamber 15, and discharges the fluid below the surface of the fluid in storage chamber 16. Storage chamber 16 also includes a storage chamber outlet pipe 20 that draws from below the surface of the fluid in storage chamber 16 and discharges into outlet pipe 14. Alternatively, storage chamber outlet pipe 20 can discharge directly to the exterior of structure 10 for combination with the outflow of outlet pipe 14 downstream of the discharge from structure 10. Secondary flow conduit 18 connects primary chamber 15 with outlet pipe 14 and draws water from below the surface of the fluid in primary chamber 15. Primary chamber 15 is further connected to outlet pipe 14 at a level above the intake and discharge of conduits 17 and 18. Outlet pipe 14 opens into primary chamber 15 and is provided with a weir 21 which allows fluid to spill over from primary chamber 15 into outlet pipe 14 when the fluid level in chamber 15 reaches sufficient height.

As illustrated in FIGS. 1 through 4, during operation, runoff water enters the structure 10 through inlet pipe 13 and flows into primary chamber 15. Primary chamber 15 will fill with runoff water up to the level of the opening into the top of surface flow pipe 17. Once the water in chamber 15 exceeds the entry height of surface flow pipe 17, water will enter and flow through surface flow pipe 17 into storage chamber 16. Water can enter surface flow pipe 17 with or without the influence of a vortex generator 22 which may be included in chamber 15, positioned adjacent the entrance to surface flow pipe 17. Heavy contaminates remain behind in chamber 15.

Storage chamber 16 will fill and retain water to the crest elevation of the storage chamber outlet pipe 20. When the water in storage chamber 16 exceeds this level, the water will flow out outlet pipe 14.

During normal operation, water will enter primary chamber 15 and fill to the crest of the surface flow pipe 17 where it will be induced to swirl and create a vortex if the vortex generator 22 is included. The surface water drawn into surface flow pipe 17 will include floating and light suspended contaminates. These contaminates will be concentrated and will flow through the surface flow pipe 17 into the storage chamber 16.

Flow pipe 17 preferably discharges below the surface of the water contained in the storage chamber 16, during normal operation. The light fluids and floating contaminates will rise to the surface of the fluid in chamber 16 and thus be separated from the below surface discharge from chamber 16 out pipe 20. As more water enters chamber 16 from surface flow pipe 17, water within chamber 16 is displaced and forced out storage chamber outlet pipe 20. The input end of storage chamber outlet pipe 20 is sufficiently below the surface of the water in storage chamber 16 so as to avoid allowing floating particles, light contaminates or oils to be released from the storage chamber 16.

Surface flow through surface flow pipe 17 and out chamber outlet pipe 20 will exist during all flow intensities of runoff water. During lower intensity flows, the flow of water through surface flow pipe 17 is the single flow path of the water.

During moderate flow rates, water continues to flow though surface flow pipe 17 and out outlet pipe 14 in the manner described above. However, in order to avoid inundation of storage chamber 16 and the possible resuspension of collected pollutants, a secondary flow will occur through the secondary flow pipe 18 when necessary and initiated by a runoff water of sufficient flow intensity.

The intake of secondary flow pipe 18 is located within primary chamber 15, below the open end elevation of surface flow pipe 17. Secondary flow pipe 18 discharges into outlet pipe 14 at a higher elevation than the storage chamber outlet pipe 20. The differences in elevation enable the secondary flow pattern to occur only during moderate or severe events when the primary flow, through surface flow pipe 17 is insufficient to accommodate all of the runoff inflow into the structure 10.

A third flow pattern will be established in extreme runoff events when the fluid in primary chamber 15 reaches an elevation above bypass weir 21, thereby overflowing the weir 21 and flowing directly into outlet pipe 14, bypassing the primary and secondary flow paths. This allows high volume flows to bypass through the system directly to the outlet 14 thereby preventing resuspension of already entrained heavy contaminates in primary chamber 15 or the flushing of floating or light fluid contaminates from chamber 16. The primary and secondary flow patterns will continue although they may be of minimal effective flow due to potential back pressure dependant on the flow rate and hydraulic state of the components within container 10.

Allowing high volume flow, which normally occurs sufficiently after the start of a rain event, to bypass the system will have a minimal effect on allowing contaminates to pass out of the container 10, due to the continued entrainment of contaminates from the early, lower volume flow during which the majority of the accumulated contaminates are washed from the paved surfaces.

A second exemplary embodiment of the invention is illustrated in FIGS. 6-19. This embodiment is also illustrated as housed within a cylindrical container 10. The cylinder 10 has a floor 11 and interior dividing walls 12 and 32, creating three separate chambers, a primary chamber 15 and a storage chamber 16, as in the previous embodiment, and an outlet chamber 33 having a raised floor 34. Outlet chamber 33 functions similar to the interior portion of outlet conduit 14 of the previously illustrated embodiment. The container 10 also has at least one inlet 13 into primary chamber 15 and at least one outlet 14 from outlet chamber 33.

The second embodiment also includes a low flow conduit 17 that has an inlet opening 30 in an upper surface at the first end of the conduit 17 situated within chamber 15, for allowing surface water to flow from chamber 15 into the conduit 17. Conduit 17 empties into chamber 16 through opening 31 in the interior dividing wall 12. The discharge into chamber 16 is above the surface level of the fluid in chamber 16 during normal flow conditions. A subsurface control plate 35, attached to the low flow conduit 17 and extending from the interior wall of container 10 to the dividing wall 12, diverts water under conduit 17 for moderate flow conditions when the level of the water exceeds the lower entry edge of moderate/bypass flow opening 38 in dividing wall 12. The surface water on the back side of conduit 17 is isolated from the surface water on the front side because conduit 17 and subsurface control plate 35 extend from the interior wall of chamber 10 to the dividing wall 12. By isolating the water surface and diverting flow below the subsurface control plate 35, floating debris in chamber 15 will be prevented from reaching the back side of conduit 17 and therefore cannot flow out the lower portion of opening 38.

A single opening 38 can function as the moderate and bypass flow opening 38 in the interior dividing wall 12. Alternatively, the wall 12 can be provided with separate openings for moderate flow and for bypass flow, with the bypass flow opening located at a higher elevation than the moderate bypass flow opening.

Outlet chamber 33 can receive water via two entry points, storage pipe outflow tube 20 and the moderate/bypass flow opening 38 in dividing wall 12. Storage chamber outflow tube 20 has an opening that is below the surface of the water in the storage chamber 16, and an upper opening which empties into outlet chamber 33 through a hole in the floor 34 of chamber 33. During low flow, pipe 20 will receive water from below the surface of chamber 16 and feed water out its upper end into outlet chamber 33. Flow opening 38 has its lower edge above the level of the inlet opening 30 of conduit 17 and above the level of the discharge of pipe 20 into outlet chamber 33.

When the low flow path through conduit 17 is sufficient to convey all of the water entering chamber 15 out into chamber 16, low flow conditions are maintained. When the inflow into chamber 15 exceeds the capacity of conduit 17, the water level in chamber 15 will rise. Moderate flow through opening 38 will occur when the level of the water in primary chamber 15 rises sufficiently to exceed the level of the lower edge of opening 38.

Figure 1:
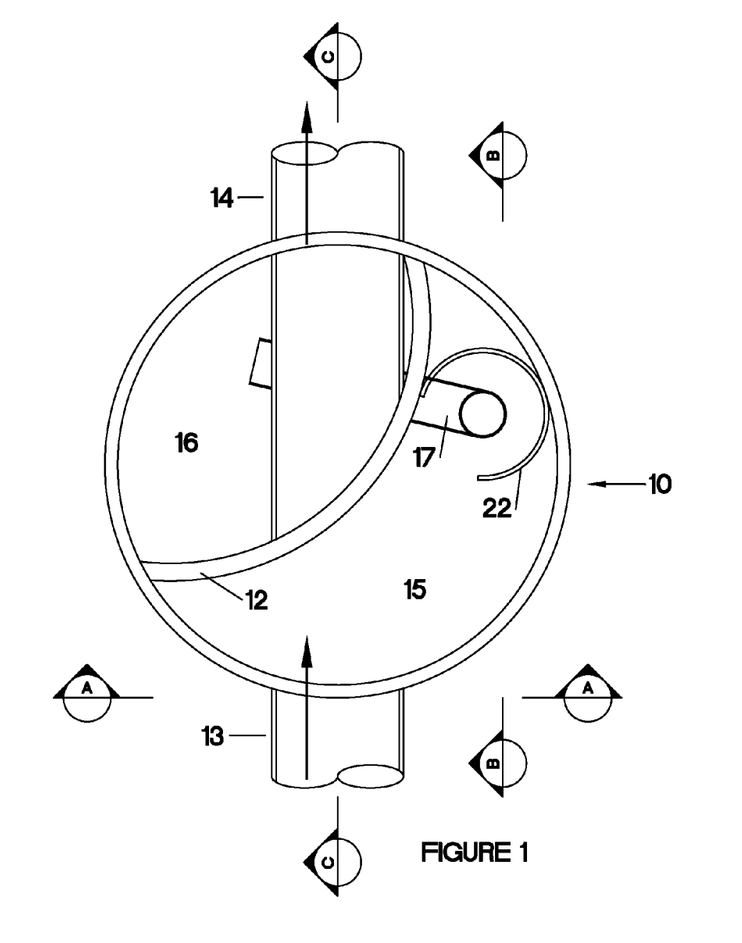
FIG. 1 is a top view of a first exemplary embodiment of the present invention with the cover removed to illustrate the internal components of the multiple flow paths of the present invention.
Figure 2:
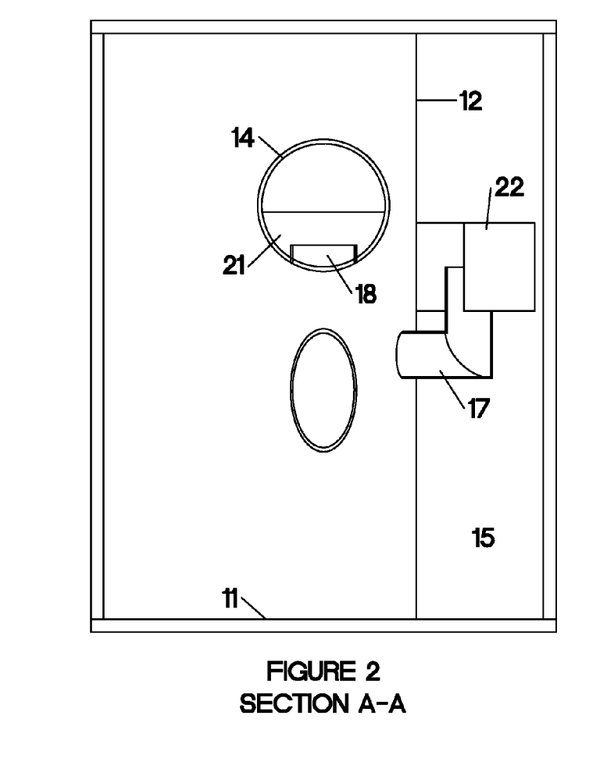
FIG. 2 is a cross sectional view of the embodiment of FIG. 1, taken along section line A-A of FIG. 1.
Figure 3:
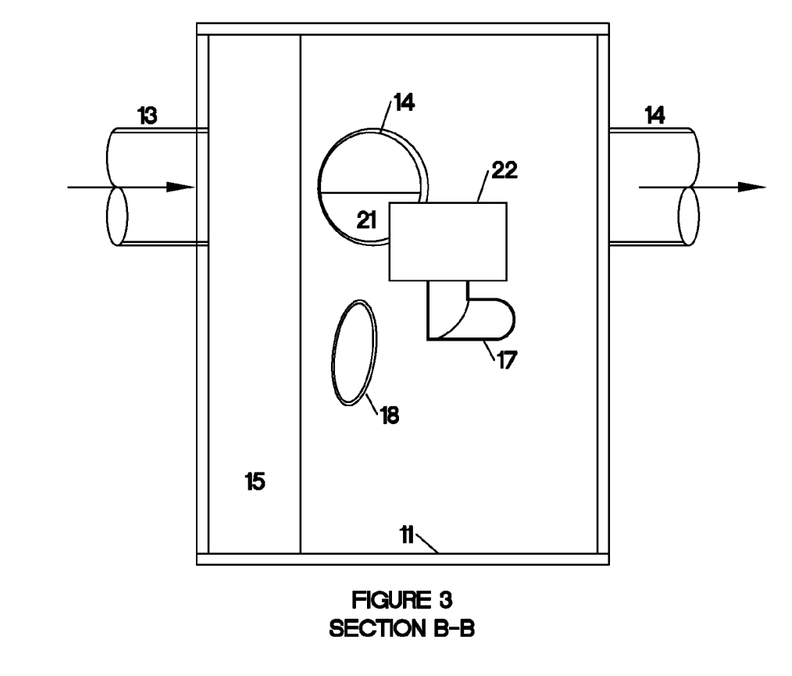
FIG. 3 is a cross sectional view of the embodiment of FIG. 1, taken along section line B-B of FIG. 1.
Figure 4:
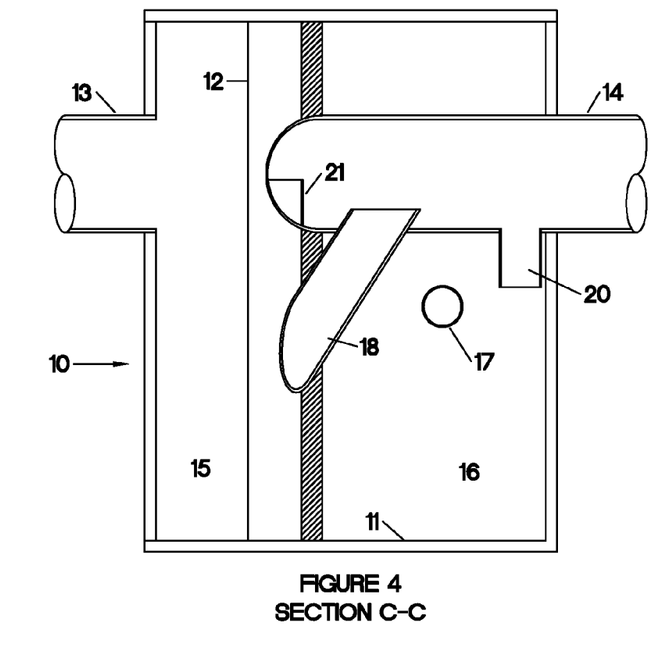
FIG. 4 is a cross sectional view of the embodiment of FIG. 1, taken along section line C-C of FIG. 1.
Figure 5:
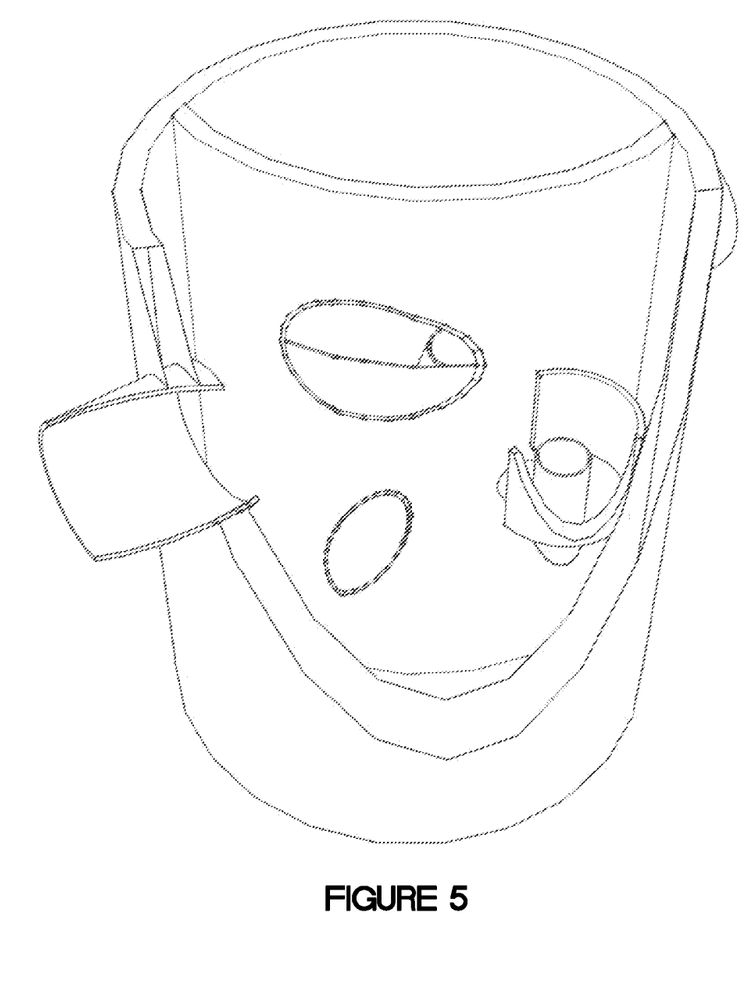
FIG. 5 is a perspective cut away view illustrating the internal configuration of the first embodiment of the present invention of FIG. 1.
Figure 6:
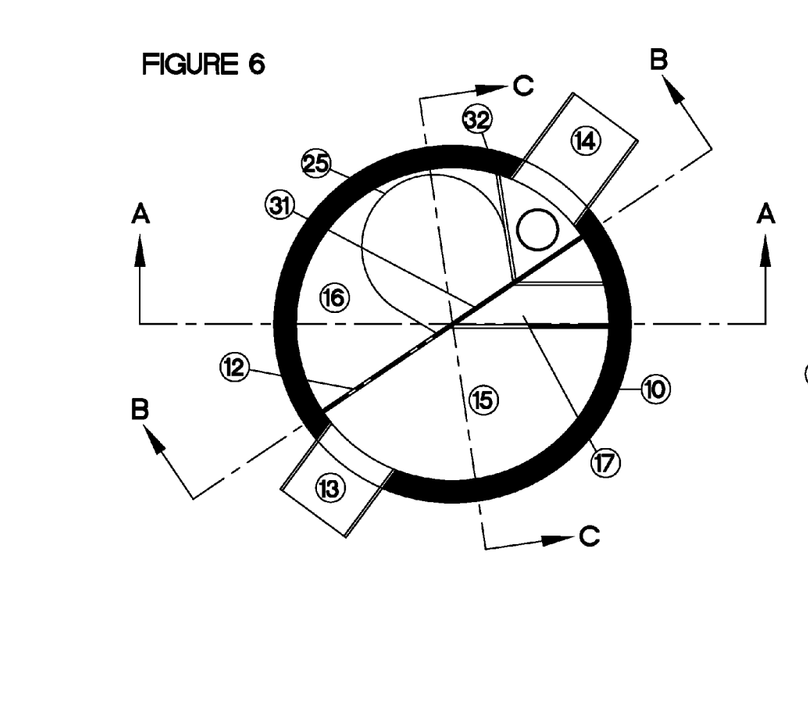
FIG. 6 is a top view of a second exemplary embodiment of the present invention with the cover removed to illustrate the internal components of the multiple flow paths of the present invention.
Figure 7:
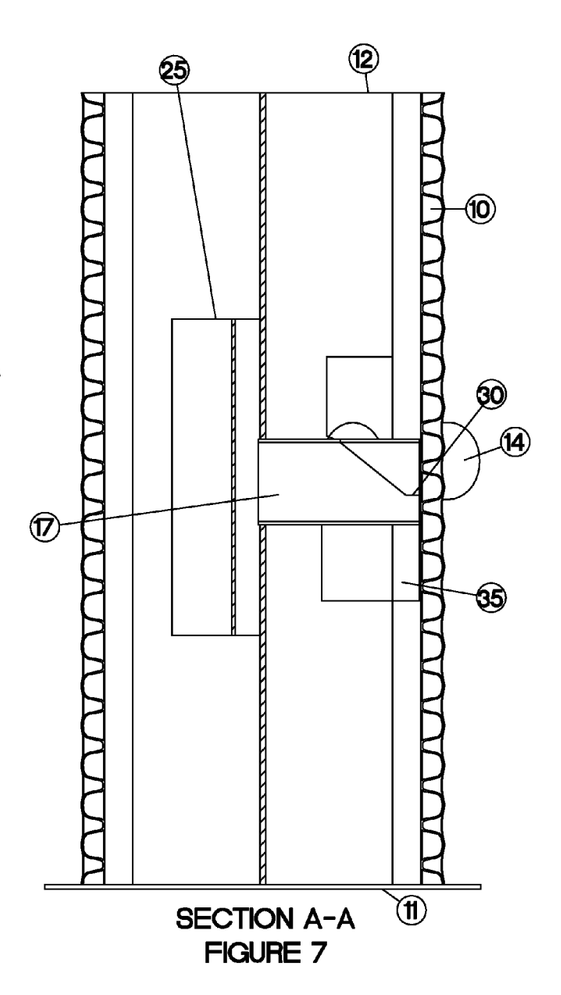
FIG. 7 is a cross sectional view of the embodiment of FIG. 6, taken along section line A-A of FIG. 6.
Figure 8:
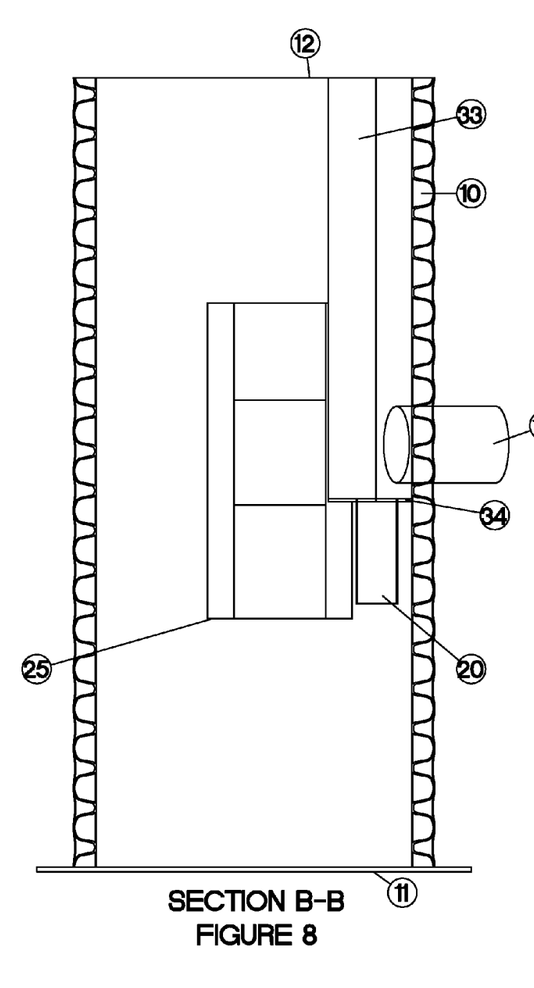
FIG. 8 is a cross sectional view of the embodiment of FIG. 6, taken along section line B-B of FIG. 6.
Figure 9:
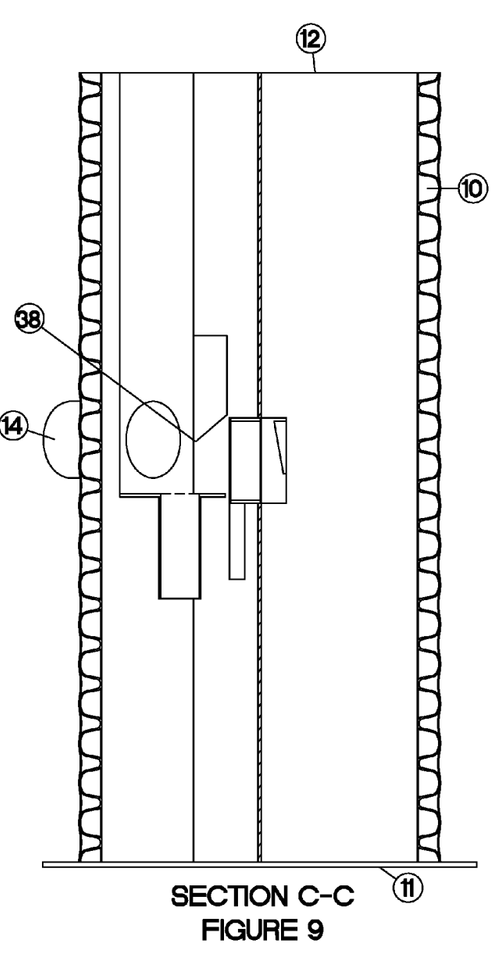
FIG. 9 is a cross sectional view of the embodiment of FIG. 6, taken along section line C-C of FIG. 6.
Figure 10:
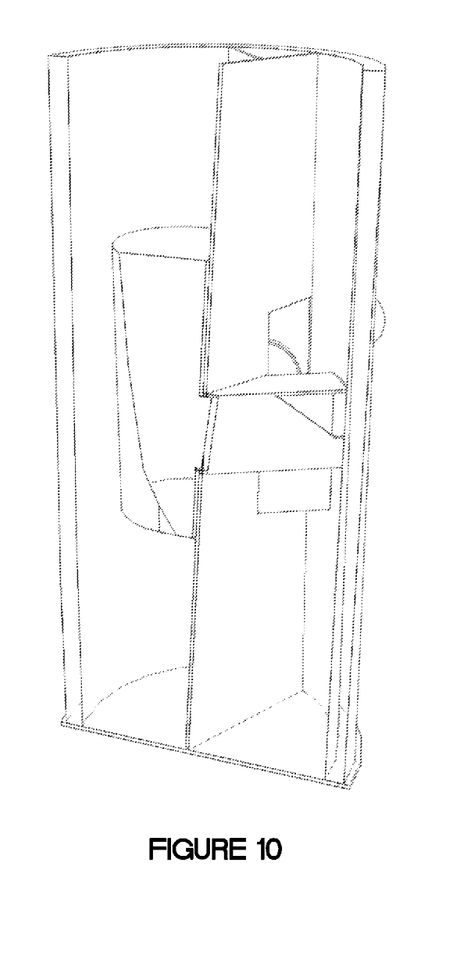
FIG. 10 is a perspective cut away view illustrating the internal configuration of the second embodiment of the present invention of FIG. 6.
Figure 11:
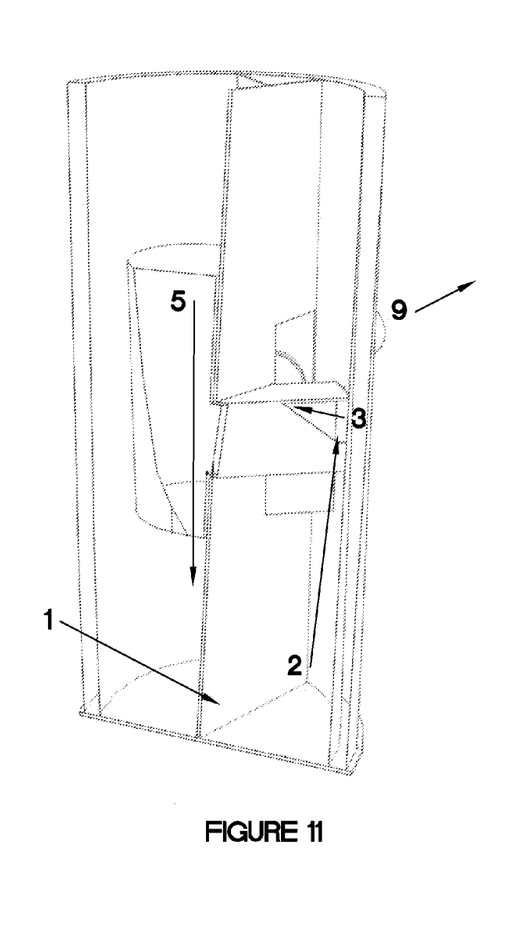
FIGS. 11 to 13 are flow diagrams illustrating standard low flow.
Figure 12:
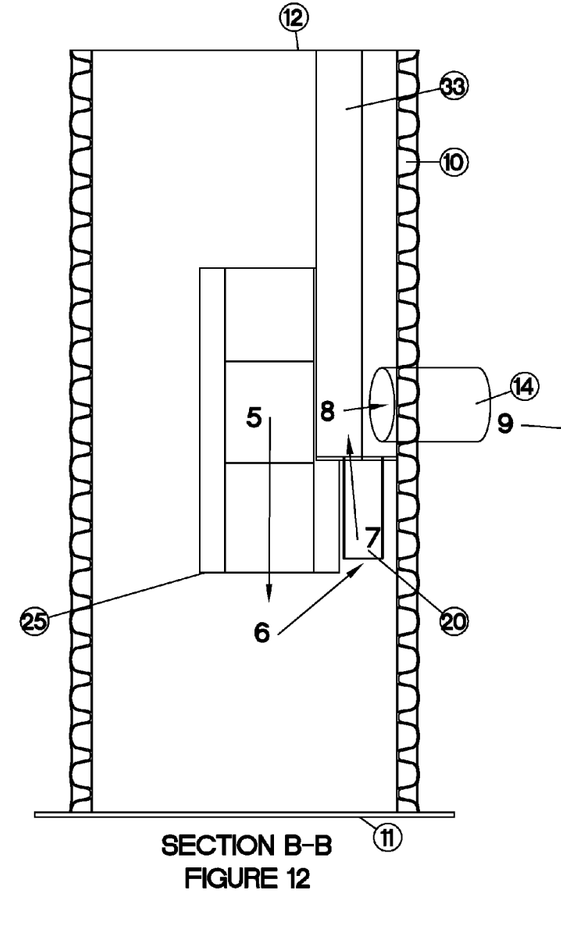
Figure 12A:
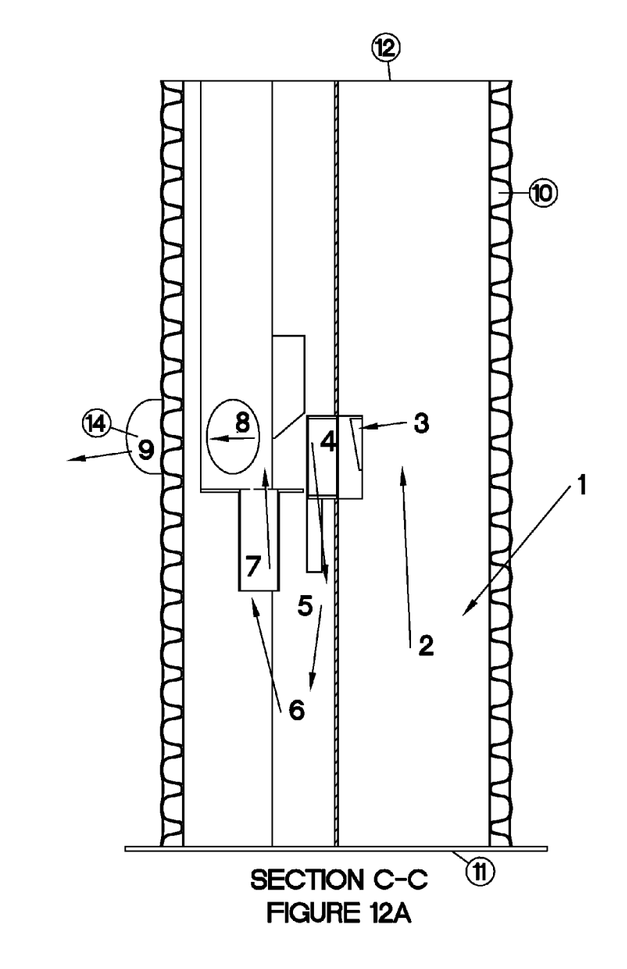
Figure 13:
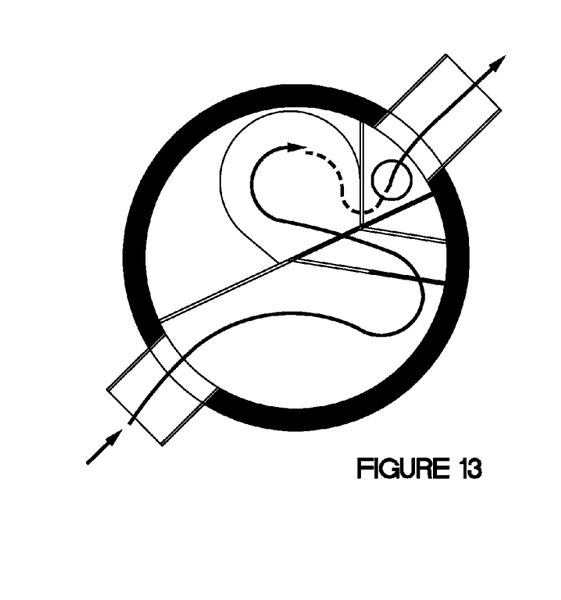

During low flow operation, as illustrated in FIGS. 11 to 13, water first enters primary chamber 15 from inflow pipe 13. When the water level within chamber 15 reaches the inlet 30 of the low flow conduit 17, the surface water will enter conduit 17 and flow into holding chamber 16, leaving submerged debris to settle to the floor of primary chamber 15. Floating debris will be transported with the water flow through conduit 17, into storage chamber 16. For the system to function without backwash, the chamber outlet pipe 14 must be lower than the inlet 30 of the low flow conduit 17.

Figure 20:
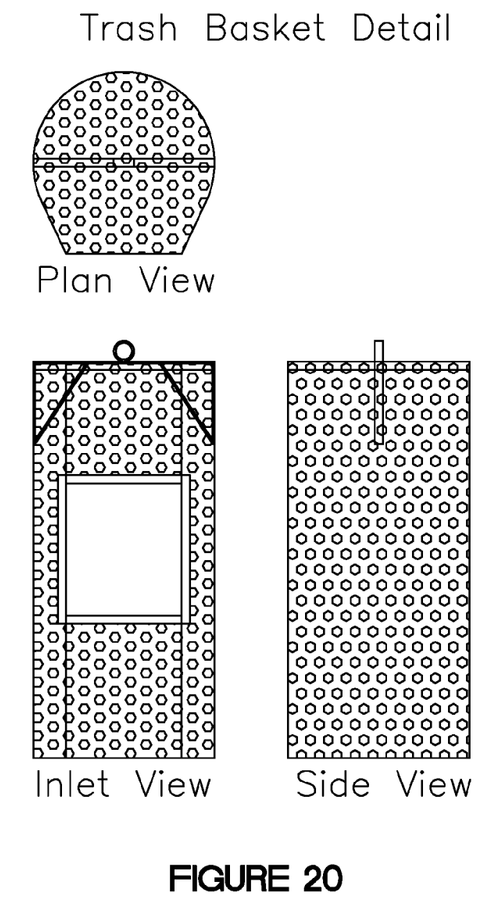
FIG. 20 illustrates the optional removable debris collection basket.

Water within primary chamber 15 will exit at the lowest point in that chamber as long as the low flow conduit 17 can maintain a flow rate sufficient to handle the inflow of water. As this water enters the low flow conduit 17 it passes through the interior dividing wall 12 into the storage chamber 16. At this point the water may enter an optional trash basket 25, as illustrated in FIG. 20, or simply enter the storage chamber 16. Any debris, heavy or floating, which enters chamber 16 with the water, will be separated by floatation, settling, or capture in a basket 25 if used. As the water enters the storage chamber 16, it displaces water from below the surface and pushes water thorough the outflow tube 20 to the outlet chamber 33 and out of the chamber 10 through the outlet pipe 14. By drawing water from below the surface, outflow tube 20 will block the flow of floating debris out of chamber 16 into outlet chamber 33, thus trapping floating debris in chamber 16.

Figure 14:
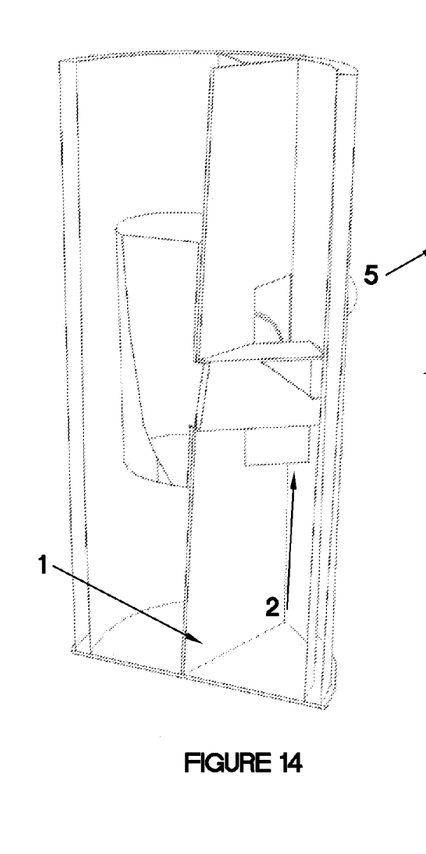
FIGS. 14 to 16 are flow diagrams illustrating moderate flow.
Figure 15:
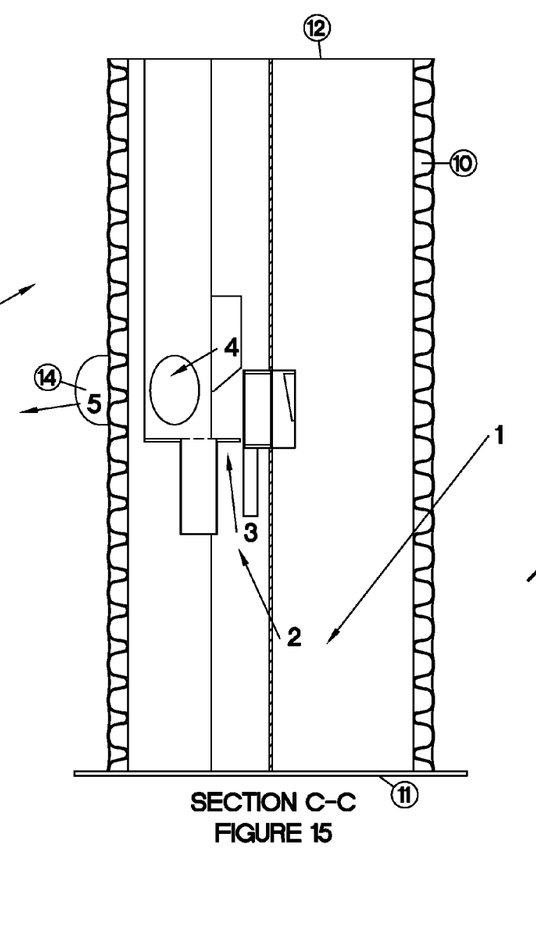
Figure 16:
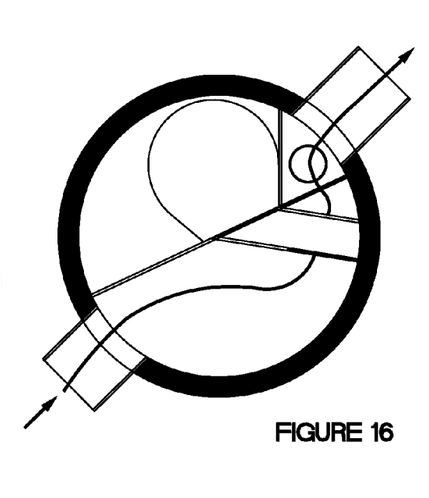

If the inlet water flow rate into chamber 15 increases, the system will move from low flow to moderate flow. During a moderate flow event, the low flow pattern will continue to operate, removing surface flow from the primary chamber and diverting it to the storage chamber. However as the water level in the primary chamber raises to a point that the water can now crest the lowest point of the moderate/bypass flow opening 38 in the interior dividing wall 12, water from below the surface in the primary chamber 15 will flow below the subsurface control plate 35 into the opening 38 behind the low flow conduit 17. This moderate flow level will be free of the surface flow that has the majority of the contaminants. These flow patterns will continue until the level of the water in the primary chamber 15 exceeds the top of low flow conduit 17. Water will then be able to crest over conduit 17 and flow out opening 38 into outlet chamber 33, including surface water.

Figure 17:
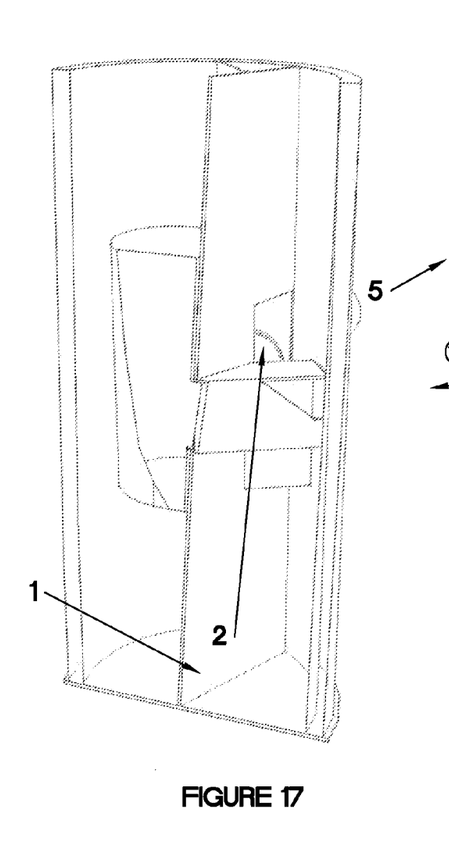
FIGS. 17 to 19 are flow diagrams illustrating high flow.
Figure 18:
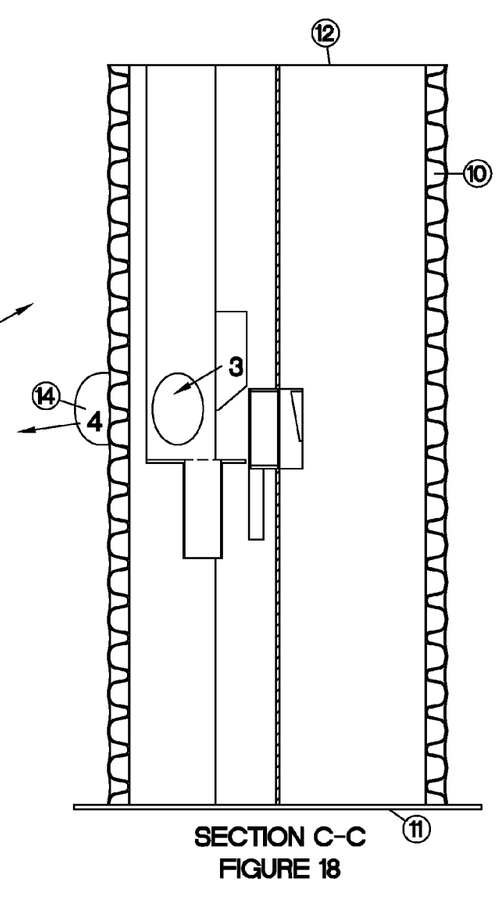
Figure 19:
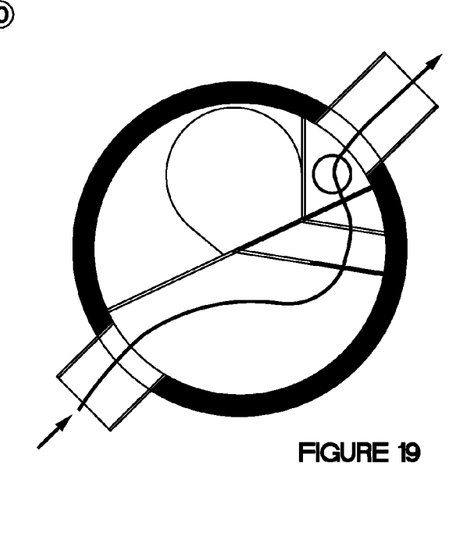

Once conduit 17 has been crested, bypass flow of all surface flow occurs and treatment of floating debris essentially stops. The same volume of water will still flow through the storage chamber but the surface flow will bypass the separation of chamber 16 and go directly over the low flow conduit 17 and pass through the higher portion of the moderate/ bypass opening 38 in dividing wall 12. At this point in a storm event, the vast majority of debris has already washed off of the paved surface and has been collected in storage chamber 16.

Splitting flows into chamber 16 prevents resuspension of collected pollutants and significantly limits the potential for the system to become occluded and cause a flow stoppage which would create a backup in the storm drain system.

In another exemplary embodiment, illustrated in FIG. 20, a basket 45 with an opening on its side to allow inflow, such that it can store the trash and debris collected for easy removal as it accumulates, is added to the flow path. The basket 25 has porous sides to allow the outflow of water while trapping debris, and is removable, as illustrated, so that the accumulated debris can be removed from the basket for disposal.

The invention claimed is:

1. A separator for separation of floating, light and heavy, contaminates from an effluent stream, comprising;
   a container:
   a dividing wall separating said container into a first chamber and a second chamber, each configured for holding a quantity of fluid from said effluent stream;
   an inlet conduit for providing fluid to said first chamber;
   an outlet conduit for discharging fluid from said container;
   a first conduit for providing fluid from said first chamber to said second chamber;
   a second conduit for providing fluid from said first chamber to said outlet conduit:
   a weir in said dividing wall for providing fluid from said first chamber to said outlet conduit;
   a first flow path from said inlet conduit into said first chamber to the surface of said quantity of fluid in said first chamber out, through said first conduit, into said second chamber below the surface of said fluid in said second chamber into said outlet conduit at a first elevation;
   a second flow path from said inlet conduit into said first chamber below said level of said fluid in said first chamber out, through said second conduit, into said outlet conduit at a second elevation above said first elevation;
   a third, bypass flow path from said inlet conduit into said first chamber to the surface of said liquid in said first chamber out, through said weir, into said outlet conduit at a third elevation, above said first and second elevations.

2. A separator for separation of floating, light and heavy, contaminates from an effluent stream, comprising:
   container;
   a dividing wall separating said container into a first chamber and a second chamber, each configured for holding, a quantity of fluid from said effluent stream;
   an inlet conduit for providing fluid to said first chamber;
   an outlet conduit for discharging fluid fro n said container;
   a first transfer conduit for transporting fluid from surface of said quantity of fluid in said first chamber, into said second chamber;
   a second transfer conduit for transporting fluid from below the surface of said fluid in said second chamber into said outlet conduit at a first elevation;
   a third transfer conduit for transporting fluid from below said level of said fluid in said first chamber into said outlet conduit at a second elevation above first elevation;
   a bypass opening in said dividing wall for transporting fluid from the surface of said liquid in said first chamber into said outlet conduit at a third elevation, above said first and second elevations.

3. The separator of claim 2, wherein said first transfer conduit discharges into said second chamber below the level of fluid in said chamber.

4. A separator for separation of floating, light and heavy, contaminates from an effluent stream, comprising:
   a container;
   a first dividing wall separating said container into a first chamber and a second chamber, each configured for holding a quantity of fluid from said effluent stream;
   a second dividing wall separating the said first and second chamber and an outlet chamber;
   an inlet conduit for providing fluid to said first chamber;
   an outlet conduit for discharging fluid from said container;

a first transfer conduit for transporting fluid from the surface of said quantity of fluid in said first chamber, into said second chamber;
a second transfer conduit for transporting fluid from below the surface of said fluid in said second chamber into said outlet chamber at a first elevation;
a moderate flow opening in said second dividing wall for transporting fluid from below said level of said fluid in said first chamber into said outlet chamber at a second elevation above said first elevation;
a bypass opening in said second dividing wall for transporting fluid from the surface of said liquid in said first chamber into said outlet chamber at a third elevation, above said first and second elevations.

* * * * *